United States Patent

Sharpe

[11] Patent Number: 6,005,874
[45] Date of Patent: Dec. 21, 1999

[54] METHOD OF PROCESSING MESSAGES IN A SECURE COMMUNICATIONS SYSTEM HAVING A PLURALITY OF ENCRYPTION PROCEDURES, AND SUCH A SECURE COMMUNICATION SYSTEM

[75] Inventor: Martin Sharpe, Blakeney, United Kingdom

[73] Assignee: Northern Telecom Limited, Montreal, Canada

[21] Appl. No.: 08/809,350

[22] PCT Filed: Sep. 25, 1995

[86] PCT No.: PCT/GB95/02266

§ 371 Date: Aug. 18, 1997

§ 102(e) Date: Aug. 18, 1997

[87] PCT Pub. No.: WO96/10318

PCT Pub. Date: Apr. 4, 1996

[30] Foreign Application Priority Data

Sep. 29, 1994 [GB] United Kingdom .................... 9419594

[51] Int. Cl.[6] .............................. H04Q 3/00; H04Q 11/04
[52] U.S. Cl. .............................. 370/524; 370/535; 380/48
[58] Field of Search ................................ 370/535, 536, 370/542, 537, 543, 544, 522, 524; 380/48, 49, 42, 43, 44, 45, 9

[56] References Cited

U.S. PATENT DOCUMENTS 5,115,466   5/1992   Presttun .................................... 380/9
5,511,124   4/1996   Bergner .................................... 380/48
5,559,890   9/1996   Obermeier et al. ........................ 380/48

*Primary Examiner*—Chau Nguyen
*Attorney, Agent, or Firm*—Lee, Mann, Smith, McWilliams, Sweeney & Ohlson

[57] ABSTRACT

In a secure communications system where messages between subscribers are encrypted according to a selection of encryption procedures, a gateway trunk is provided. The gateway trunk comprises a telecommunications trunk (35) with one or more cryptographic devices (A,B,C) inserted in each traffic channel and a separate signaling channel (37), and a traffic channel is selected according to a code dialed by a subscriber. The gateway trunk may be associated with a PABX (31) such that messages are routed through a channel of the trunk corresponding to the cryptographic device required. Pairs of different cryptographic devices may be inserted in each channel of the trunk to effect conversion from one encryption procedure to another.

7 Claims, 4 Drawing Sheets

METHOD OF PROCESSING MESSAGES IN A SECURE COMMUNICATIONS SYSTEM HAVING A PLURALITY OF ENCRYPTION PROCEDURES, AND SUCH A SECURE COMMUNICATION SYSTEM

This invention relates to communications systems and in particular to secure or encrypted communications systems.

BACKGROUND OF THE INVENTION

Military, government and some commercial institutions rely on secure voice transmission systems to conduct their business. This is usually achieved by encrypting communications and providing subscribers with cryptographic devices that can encode transmitted signals and decode received signals. These devices must work over the existing telecommunications infrastructure and therefore are subjected to substantially different quality transmission paths dependent upon the subscribers' locations. For this reason different cryptographic devices are used to provide secure communication over different routes. Unfortunately these different cryptographic devices cannot communicate directly with each other and subscribers may thus need to be equipped with several devices, having to select and connect the appropriate one in order to achieve secure voice communications.

One approach to this is to provide a cryptographic gateway that permits different cryptographic devices to interoperate. This provides a seamless communication channel between two subscribers with different cryptographic devices. Cryptographic interworking is achieved by essentially connecting two different systems back-to-back and this can be controlled manually, semi-automatically or fully-automatically. Manual gateways are expensive to run, especially if 24 hour service is required. Previous designs of automated gateways have required bespoke developments making them relatively expensive. In one automatic gateway cryptographic pairs are associated with a dedicated PABX, the PABX provided with extra functions and additional control equipment specifically to support the gateway facility.

In addition, a number of cryptographic pools employing trunks have been proposed for PABXs. In Japanese Patent Application number 85-121742 (published as JP 61-278256) a PABX is provided with a crypto trunk. A subscriber requiring encryption dials the number of the crypto trunk and the call is routed through the crypto trunk. This arrangement requires modifications to the PABX, and neither provides a selection of crypto types nor the facility for cryptographic conversion. In U.S. Pat. No. 5,115,466 a crypto-pool is connected to a PABX by a trunk. In the crypto-pool one crypto device is provided for every pair of trunk lines, and a management unit coordinates operation of the crypto-pool. This has the disadvantage of the cost of the management equipment, and does not provide for cryptographic conversion. This arrangement also requires authentication and the exchange of crypto keys. Patent Application EP 511,497 A2 (Alcatel) discloses a security guard which includes crypto modules, routing devices and a managing device for managing the crypto modules.

The object of the invention is to provide an improved cryptographic interface between subscribers which minimises or overcomes these disadvantages.

SUMMARY OF THE INVENTION

According to the invention there is provided a secure communications system in which messages between subscribers are encrypted, there being a plurality of encryption procedures, the system including a gateway trunk comprising a telecommunications trunk having:
  a multiplexer, to demultiplex the trunk into a plurality of constituent traffic channels and a signalling channel;
  at least one cryptographic device inserted in each of the demultiplexed traffic channels, there being a plurality of different types of cryptographic devices;
  a further multiplexer to multiplex the traffic channels and signalling channel, and;
  a bypass to couple the signalling channel directly between the multiplexers without subjecting it to the effects of the cryptographic devices,
wherein the gateway trunk provides an interface between subscribers and wherein the system is such that messages are routed through a traffic channel of the gateway trunk according to a code dialled by a subscriber, said code identifying a required at least one cryptographic device.

The invention also provides a method of processing messages in a secure communications system in which messages between subscribers are encrypted, there being a plurality of encryption procedures, the system including a gateway trunk which provides an interface between subscribers, the method comprising:
  demultiplexing the trunk into a plurality of constituent traffic channels and a signalling channel;
  providing at least one cryptographic device in each of the demultiplexed traffic channels, there being a plurality of different types of cryptographic devices;
  multiplexing the constituent traffic channels and the signalling channel;
  wherein the signalling channel is coupled directly between the multiplexers without being subjected to the effects of the cryptographic devices,
and wherein messages are routed through a traffic channel of the gateway trunk according to a code dialled by a subscriber, said code identifying a required at least one cryptographic device.

In a preferred embodiment of the invention the gateway trunk is associated with a switching centre, such as a PABX.

In a further preferred embodiment of the invention a pair of different cryptographic devices, connected back-to-back, are inserted in each traffic channel of the gateway trunk to convert messages from one encryption procedure to another. Direct connection between cryptographic types in this manner avoids some of the problems of prior art systems where a message, decrypted by a first crypto device, is re-routed through a switch in clear form to a second crypto device. Re-routing in this prior art manner relies on the integrity of the switch and may result in the clear message being incorrectly routed, such as by a programming error.

The different interfaces required by the cryptographic terminal devices may be supported by different interfaces on the cards of the multiplexers.

Using a trunk in this way allows standard telecommunications multiplexers to be employed to demultiplex the individual channels of the trunk to provide the connectivity to the cryptographic devices. This minimises equipment costs and reduces the risk of technical failure compared with more complex solutions.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
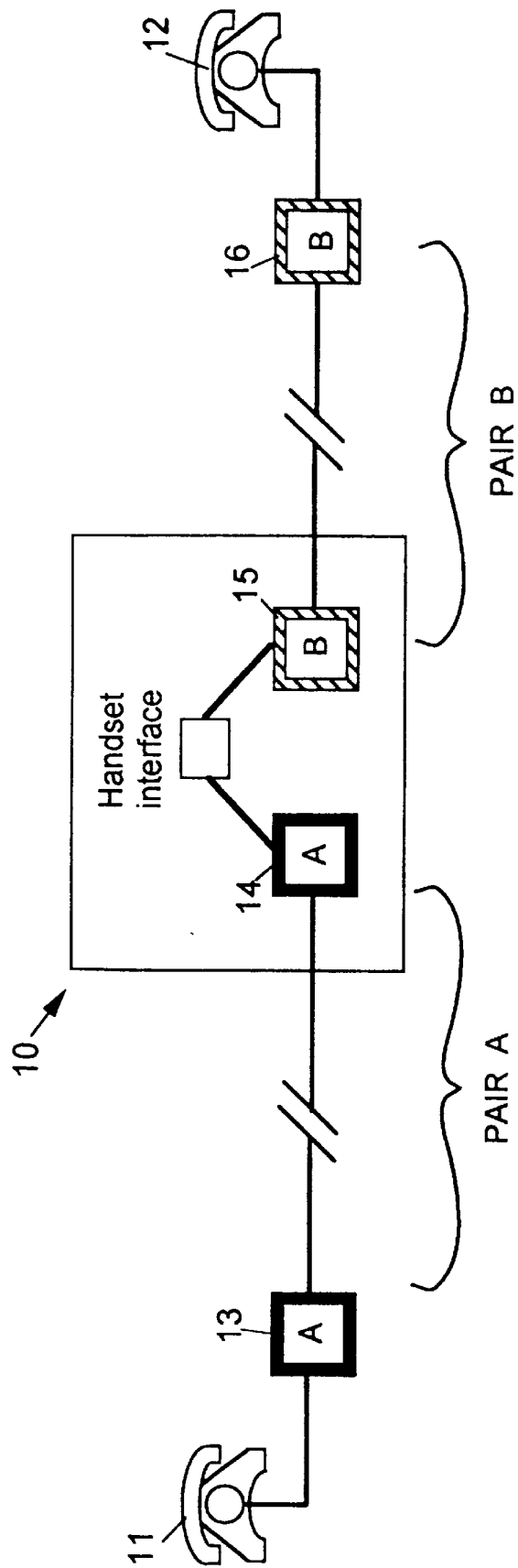
FIG. 1 is a schematic diagram illustrating the interworking of cryptographic pairs.

Referring to FIG. 1, the purpose of a cryptographic gateway 10 is shown. Subscribers 11, 12 encrypt their communications but each uses a different encryption method 13,16. Gateway 10 comprises cryptographic devices 14,15 compatible with the subscriber units 13,16 and an interface to allow devices 14,15 to be connected together. The cryptographic devices are subscriber units designed to be connected to standard telephone extension (i.e. POT), ISDN Basic Rate Access (BRA) or X.21 interfaces.

Figure 2:
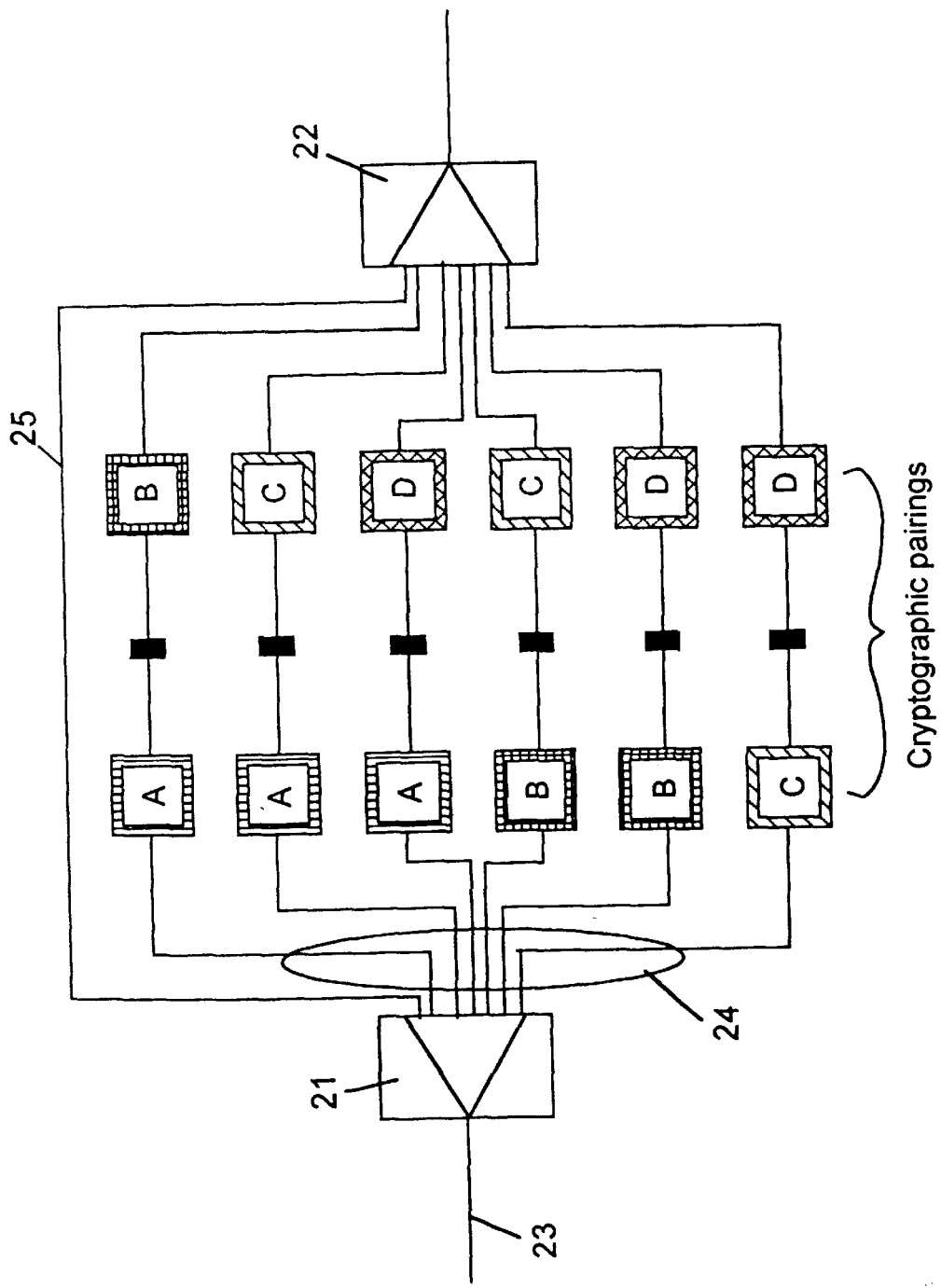
FIG. 2 is a schematic diagram of an embodiment of the invention showing cryptographic pairs inserted into a telecommunications trunk.

Referring to FIG. 2, a cryptographic gateway trunk in accordance with one aspect of the present invention is shown. Multiplexers/DeMultiplexer 21,22 and a plurality of different cryptographic pairs are inserted into a telecommunications trunk 23. The trunk may be a standard 2 Mbit/s digital trunk although other sizes of trunk and other types (e.g. FDM) could also be used. Six cryptographic pairings are shown as an example. The supporting network infrastructure will route calls via the appropriate channel and in the appropriate direction according to the cryptographic conversion required. /DeMultiplexers Multiplexers 21,22 are provided with interfaces 24 to match the cryptographic devices inserted into each channel; the interfaces may conveniently be provided as cards on the multiplexer equipment. Any multiplexer may be used. The signalling channel 25 of the trunk is connected directly between multiplexers/demultiplexer 21,22.

The routing of calls via the channels which contain the appropriate cryptographic pairings is easily achieved by using standard routing techniques and may be provisioned by connecting the trunks to an existing PABX. This permits the PABX to act as a hub for the gateway service.

Figure 3:
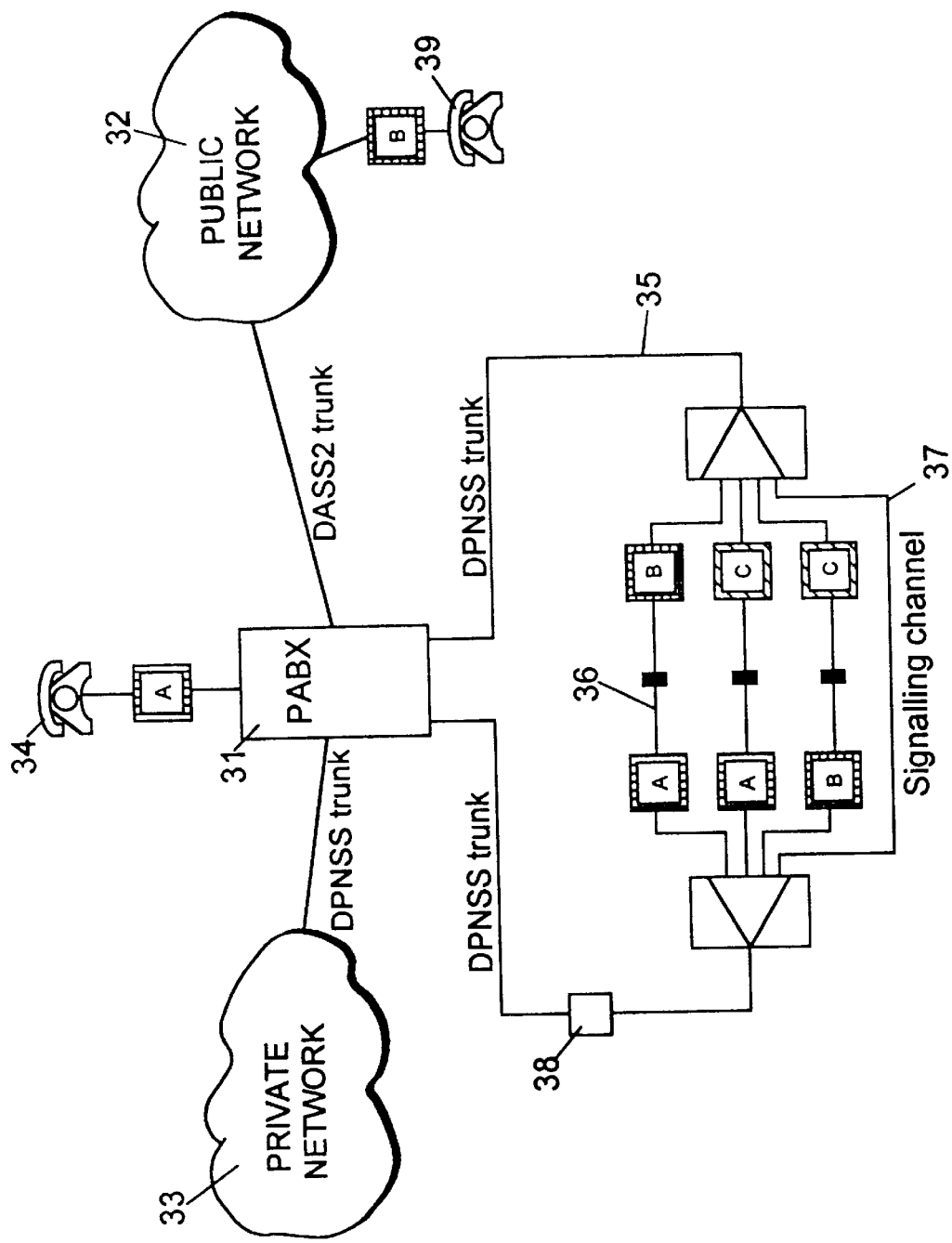
FIG. 3 shows a cryptographic gateway incorporating the system architecture of FIG. 2.

Referring to FIG. 3, an existing PABX 31, with a cryptographic gateway trunk, may be connected to various public 32 and private 33 networks. To illustrate the operation of the system, a subscriber 39 on the public network dials a subscriber 34 attached to PABX 31. Subscriber 39 encrypts using procedure B and subscriber 34 encrypts using procedure A. When subscriber 39 dials PABX 31 the call is looped via a channel of gateway trunk 35 corresponding to the required cryptographic conversion. In this case the conversion required is (B→A) so channel 36 is selected. The call continues to subscriber 34, although it would also be possible to forward the call to some destination on the private network 33.

To permit transparent signalling (i.e. through or secondary dialling) the demultiplexed signalling channel within the trunk (channel 16 for a digital 2 Mbit/s trunk) is connected directly through the gateway and is not subject to any effects of the cryptographic devices. Hence, the gateway is totally transparent to the network. This allows standard, unmodified equipment to be used with the gateway and results in considerable savings in cost. A further security advantage offered by transparent signalling is that a subscriber may dial from a network, through a PABX, and on to a second subscriber on a different network without requiring any special routing tables at the PABX.

To enable the appropriate cryptographic pairing selection at the gateway the calling (source) and called (destination) cryptographic equipment types need to be identified. This may conveniently be achieved by the subscribers dialling additional digits to identify that a 'gateway' call is being made and to identify the type of source and destination cryptographic equipment.

For example, a subscriber on a private network may represent dial a first digit to gain access to the gateway facility (in the same manner as many subscribers within an organisation must dial a '9' for an outside line), the next digit may represent the source cryptographic equipment type and the next digit may represent the destination cryptographic equipment type. The following digits would then represent the normal dialling code for the location and extension number of the destination cryptographic equipment, as in a conventional call.

A subscriber on the public network would first dial a number representing the gateway using the Direct Inward System Access (DISA) facility and the host PABX would return a secondary dial tone to the subscriber. The subscriber would then dial digits to identify the equipment types and finally the destination number (public or private network access). The host PABX would then route the call via the cryptographic gateway trunk to the destination subscriber.

The cryptographic pairings would be represented as trunk groups within the digital trunk of the gateway facility. This enables the host PABX to route the call via the appropriate trunk channel (cryptographic pairing) en route to the destination subscriber. Routing techniques such as these are common practice and are used by private and public networks to provide various services such as free-phone numbers, automatic call distribution etc.

Some secure voice cryptographic equipment uses the ISDN to provide a secure call over a pure 64 kbit/s data path. If it is necessary to connect a digital type cryptographic terminal to an analogue based cryptographic terminal one leg of the call is identified as a 64 kbit/s data call and the other leg as a standard (i.e. voice) call. PABXs will not generally permit a connection between an analogue and digital call. Referring again to FIG. 3, to overcome this problem a signalling converter 38 is used to change a digital (data) call into a voice call (and vice versa) for the relevant channels to satisfy the requirements of the host PABX. This is achieved by modifying the service indicator code (SIC) in the signalling protocol from data to voice and voice to data as appropriate.

Clearly, the SIC code need only be modified when connecting voice and data calls.

The embodiment described here uses the capabilities of a 'host' PABX. In order to be used as a host a PABX must:

be able to operate as a transit switch;

be located at a suitable point in the network in order to provide adequate connectivity and also be in a position that the critical components of the facility can be securely protected;

have the capacity to provide the additional trunk interfaces to the cryptographic equipments;

be capable of providing the necessary routing and digit translation functions to support the facility.

In a further embodiment, not illustrated, a gateway trunk is associated with a PABX in the same manner as FIG. 3 but the trunk comprises single cryptographic devices inserted into each channel of a trunk. In this embodiment conversion is from encrypted (e.g. type 'B') to clear, or vice-versa. This arrangement would be useful where subscribers connected to PABX 31, who do not encrypt their calls, wish to communicate with a subscriber such as subscriber 39 who does encrypt.

While the gateway trunk has been described in connection with a host PABX, as would be found at many organisations, other forms of switching centres may be used as a host.

Figure 4:
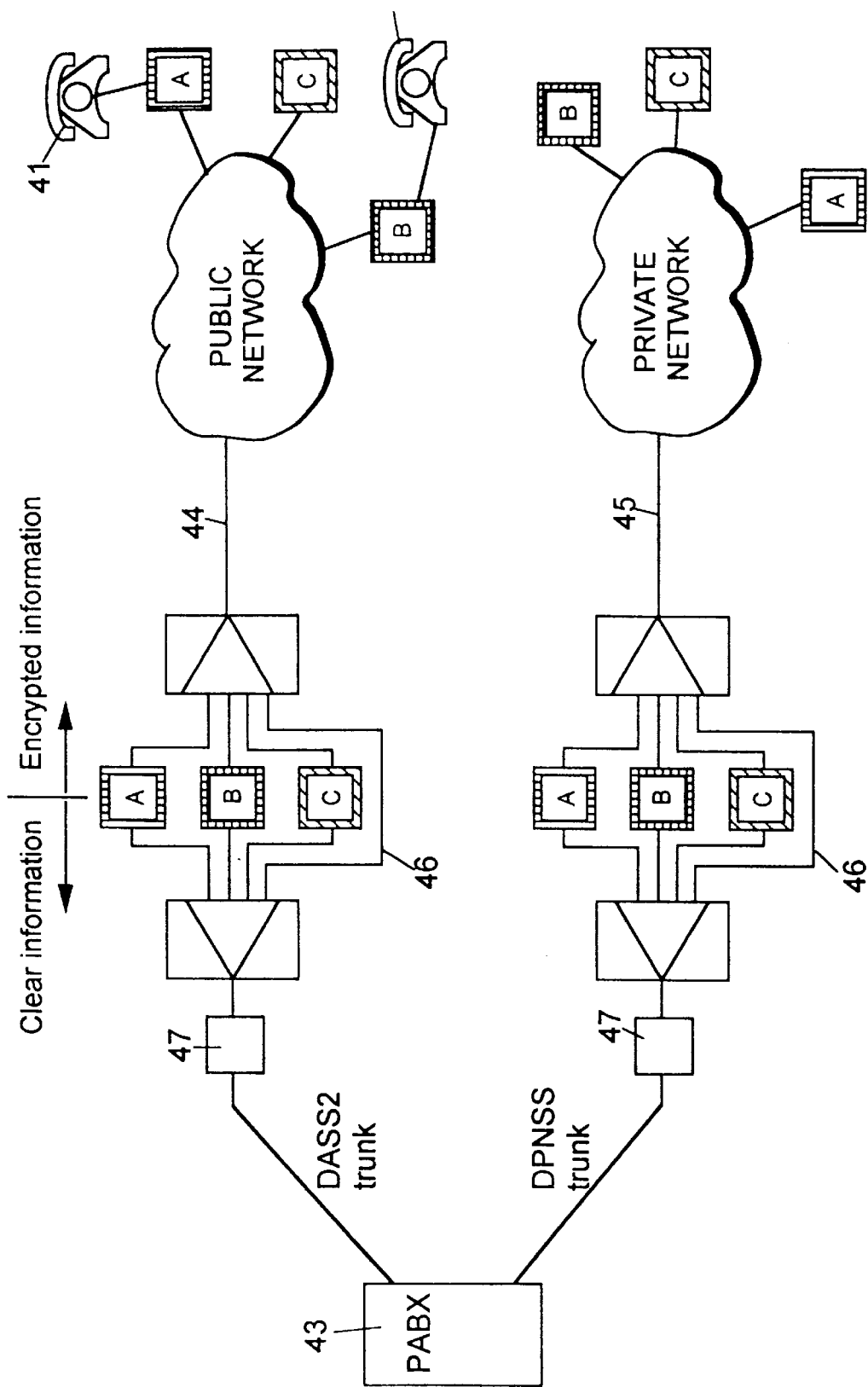
FIG. 4 shows an alternative secure gateway construction.

The principle of placing the cryptographic equipment transparently in trunks can also be used where an organisation has a "system high" PABX or network. An organisation's network would usually be isolated by means of physical separation security but by placing cryptographic equipment in trunks to public or private networks members of the organisation may be remotely located but still be capable of secure communications with the organisation. A further embodiment of the invention that allows this is illustrated in FIG. 4. Subscribers 41 and 42 linked to the public network communicate with PABX 43. A cryptographic device is placed in each of the channels of trunks 44,45 leading to PABX 43. The number dialled by subscribers 41,42 determines the channel that their call is routed through. As an example, subscriber 41, encrypting using procedure A, may need to dial a digit '1' to select the channel having a cryptographic device A associated with it, and similarly subscriber 42 may need to dial a '2' to select a B channel. There could be more than one channel of each cryptographic type. Signalling channels 46 are linked directly between the multiplexer pairs without passing through the cryptographic equipment. Signalling converters 47 are also provided as in the FIG. 3 embodiment to allow voice and data calls to be interconnected.

A system in accordance with this invention has been formally demonstrated and has proved to meet the requirements of providing an automatic cryptographic gateway facility.

I claim:

1. A secure communications system in which messages between subscribers are encrypted, there being a plurality of encryption procedures, the system including a gateway trunk comprising a telecommunications trunk having:

a demultiplexer, to demultiplex the trunk into a plurality of constituent traffic channels and a signalling channel;

at least one cryptographic device inserted in each of the demultiplexed traffic channels, there being a plurality of different types of cryptographic devices;

a multiplexer to multiplex the traffic channels and signalling channel, and;

a bypass to couple the signalling channel directly between the multiplexer and demultiplexer without subjecting it to the effects of the cryptographic devices, wherein the gateway trunk provides an interface between subscribers and wherein the system is such that messages are routed through a traffic channel of the gateway trunk according to a code dialled by a subscriber, said code identifying a required at least one cryptographic device.

2. A secure communications system as claimed in claim 1 wherein the gateway trunk is associated with a switching centre.

3. A secure communications system as claimed in claim 2 wherein the switching centre is a PABX.

4. A secure communications system as claimed in claim 1 wherein a pair of different cryptographic devices connected back-to-back are inserted in each traffic channel of the gateway trunk to convert messages from one encryption procedure to another.

5. A secure communications system as claimed in claim 1 wherein the channels of the trunk are demultiplexed by the demultiplexer and interfaces to match the cryptographic devices are provided as part of the demultiplexer.

6. A secure communications system as claimed in claim 1 wherein a signalling converter is inserted in the signalling channel of the gateway trunk to allow analogue and digital calls to be interconnected.

7. A method of processing messages in a secure communications system in which messages between subscribers are encrypted, there being a plurality of encryption procedures, the system including a gateway trunk which provides an interface between subscribers, the method comprising:

demultiplexing the trunk into a plurality of constituent traffic channels and a signalling channel;

providing at least one cryptographic device in each of the demultiplexed traffic channels, there being a plurality of different types of cryptographic devices;

multiplexing the constituent traffic channels and the signalling channel;

wherein the signalling channel is coupled directly between the a multiplexer and a demultiplexer without being subjected to the effects of the cryptographic devices, and wherein messages are routed through a traffic channel of the gateway trunk according to a code dialled by a subscriber, said code identifying a required at least one cryptographic device.

* * * * *